United States Patent [19]
Barnes

[11] 3,831,736
[45] Aug. 27, 1974

[54] POWER DRIVEN MAGNETIC CONVEYOR
[75] Inventor: Gerald Barnes, South Orange, N.J.
[73] Assignee: Amerace Esna Corporation, New York, N.Y.
[22] Filed: July 10, 1972
[21] Appl. No.: 270,191

Related U.S. Application Data
[60] Division of Ser. No. 30,817, April 22, 1970, which is a continuation of Ser. No. 605,769, Dec. 29, 1966, abandoned.

[52] U.S. Cl.... 198/41, 198/276, 198/287, 198/289
[51] Int. Cl............................................. B65g 17/46
[58] Field of Search...................................... 198/41

[56] References Cited
UNITED STATES PATENTS
| | | | |
|---|---|---|---|
| 2,711,309 | 6/1955 | Hess | 198/41 |
| 2,731,132 | 1/1956 | Socke | 198/41 |
| 3,052,340 | 9/1962 | Lyons et al. | 198/41 |
| 3,164,081 | 1/1965 | Vincze | 198/41 |

FOREIGN PATENTS OR APPLICATIONS
738,463   10/1955   Great Britain...................... 198/41

Primary Examiner—Evon C. Blunk
Assistant Examiner—Joseph E. Valenza
Attorney, Agent, or Firm—Richard A. Craig; S. Michael Bender; Martin Sachs

[57] ABSTRACT

A magnetic conveyor is provided including a plurality of holding fixtures for articles of magnetic material. The fixtures are adapted to be mounted on a power driven endless belt in relatively close proximity. Each holding fixture utilizes a permanent magnet plate disposed between flat magnetic pole pieces, all of which are adapted to be sandwiched between a pair of non-magnetic members. The permanent magnet plate retains a cylindrically shaped article of magnetic material in position within opposed and aligned notches, which latter are provided in the non-magnetic member and extend below the top face of the pole pieces.

2 Claims, 10 Drawing Figures

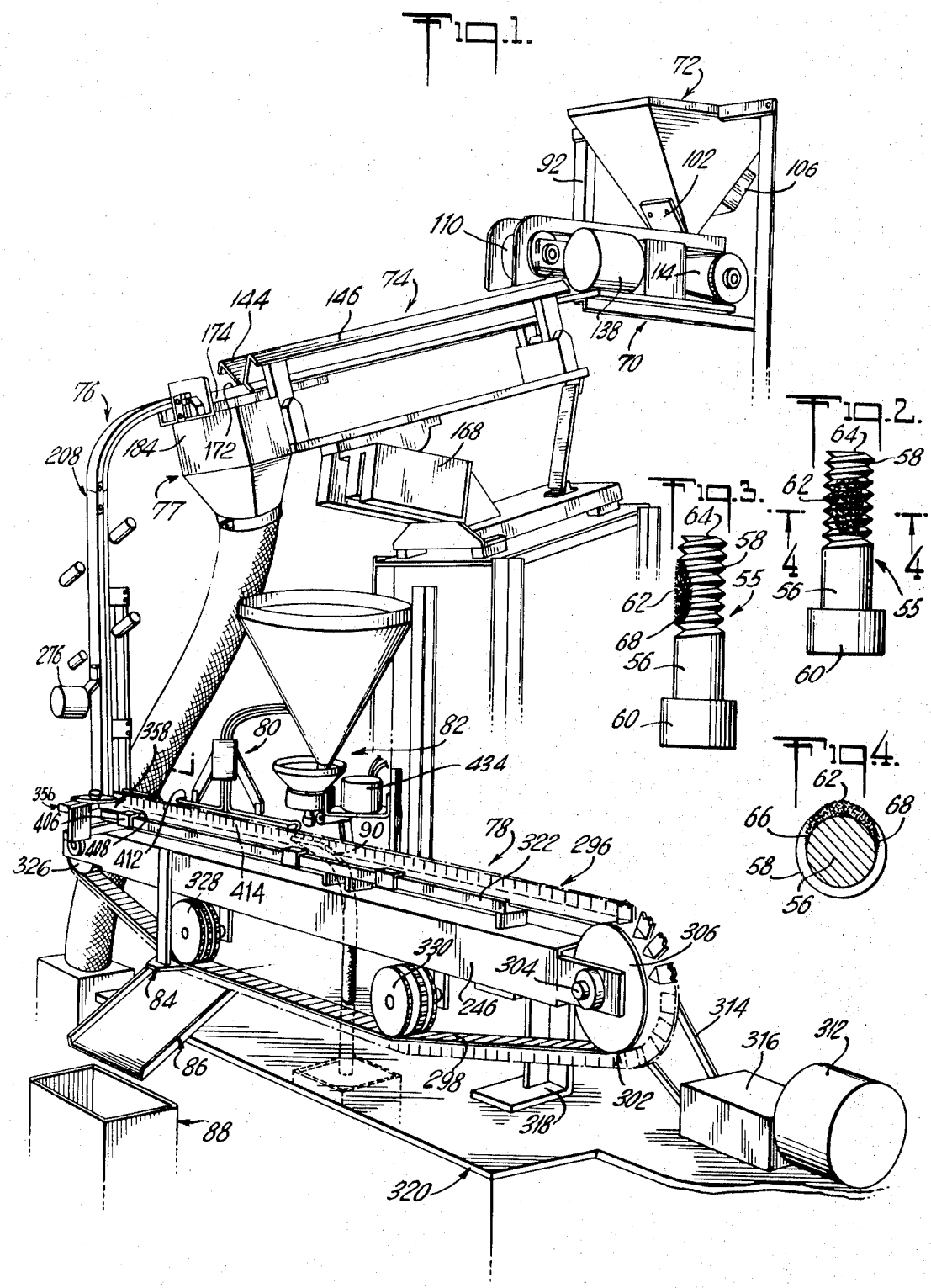

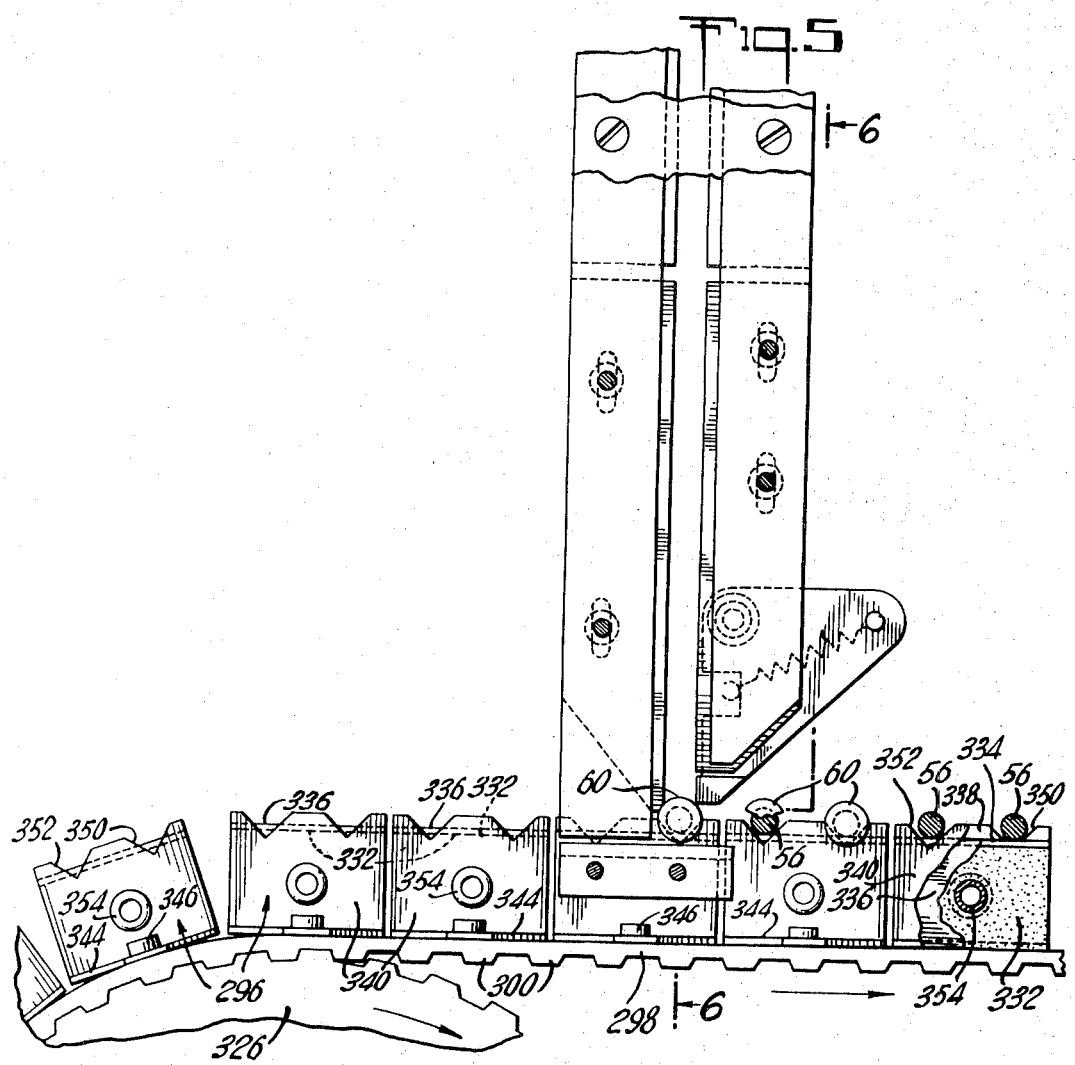

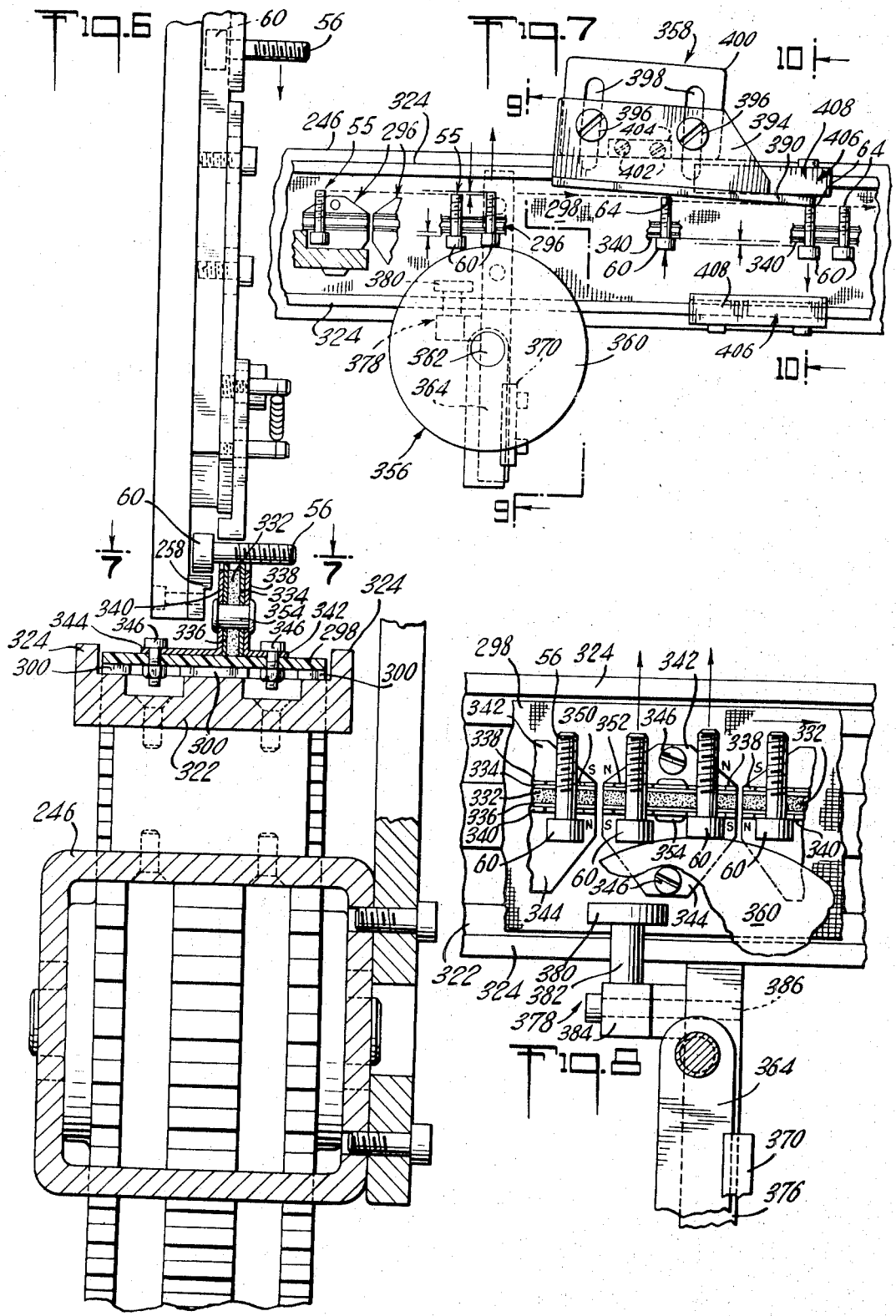

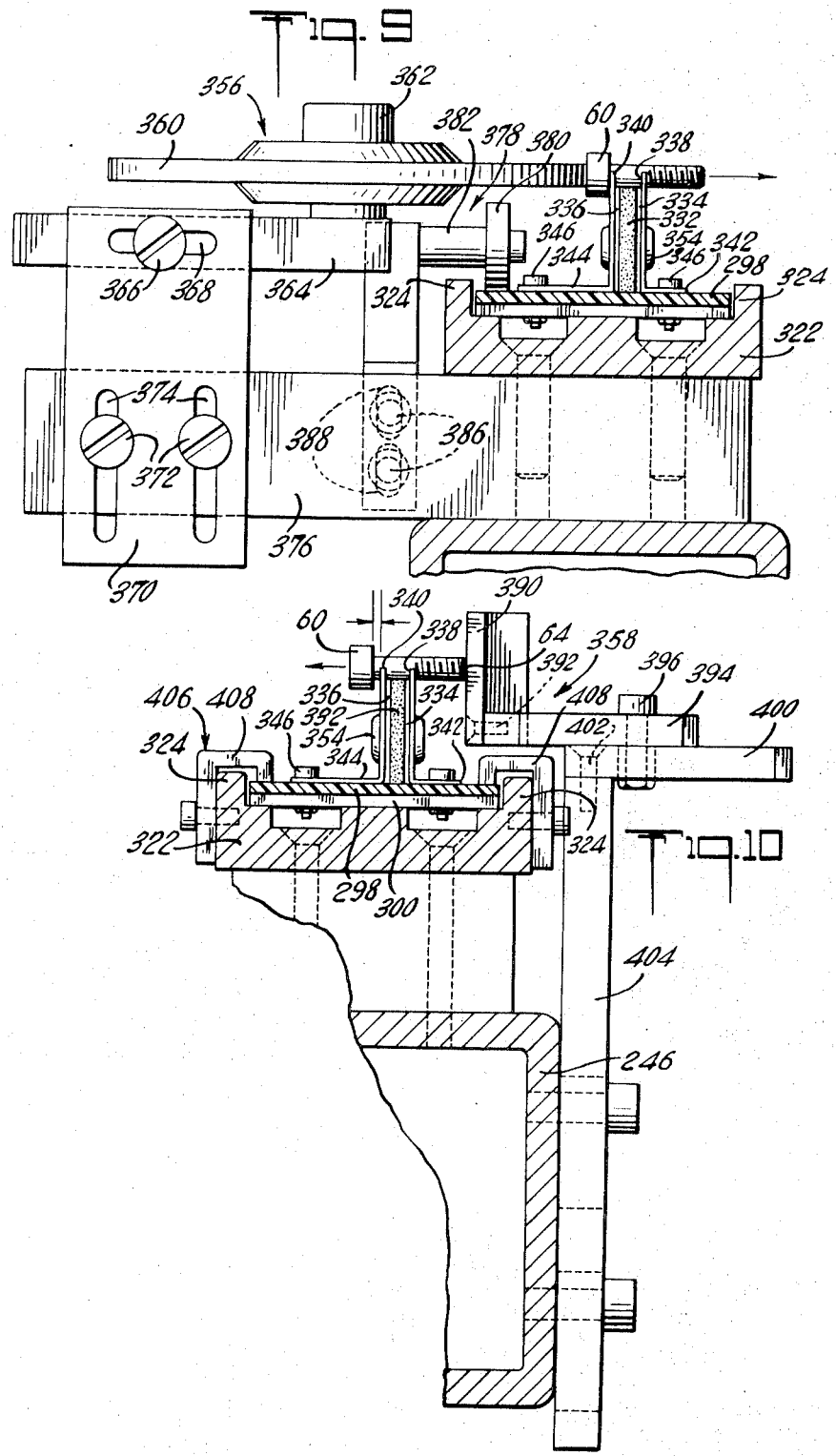

POWER DRIVEN MAGNETIC CONVEYOR

BACKGROUND OF THE INVENTION

This is a division of copending application Ser. No. 30,817 filed Apr. 22, 1970, which is a continuation of Application No. 605,769, filed Dec. 29, 1966, now abandoned.

This invention relates to a machine for making self-locking externally threaded articles, such as screws, each having a plastic locking patch of limited axial extent bonded to the thread surface of the article and, in particular, to a power driven magnetic conveyor which includes a holding fixture for properly positioning the screws during manufacture. The invention helps make possible the mass production of externally threaded articles as disclosed in Preziosi U.S. Pat. No. 3,294,139.

Self-locking screws having plastic inserts have been limited in use by reason of their high cost of manufacture. In manufacturing such a product it is necessary to form a hole, a groove, or a multiplicity of grooves, in the body of such screw; the hole, groove, or grooves must be formed to precisely determined dimensions, within very close tolerances; a plastic member or insert must be made to precisely determined dimensions, within very close tolerances, and the screws and the preformed plastic inserts must be brought into precisely controlled positions of registration so that the inserts may be pressed into the hole, groove or grooves of the screws without causing damage to either the threads of the screws or to the inserts.

These essential requirements of any machine or method for assembling the plastic inserts and the self-locking screws seriously limit the rates and the costs of production and therefore significantly limit their fields of use.

Such plastic insert self-locking screws are further limited in use by reason of the fact that the hole or groove in each screw so reduces the strength of the screw that a given size plastic insert self-locking screw cannot compete in that respect with other types of self-locking screws of uninterrupted thread forms.

It is often not feasible or possible to redesign the product with which a plastic insert self-locking screw might usefully be employed, to accommodate, for reasons of reduced strength, a larger size screw than that called for by the original design.

It is accordingly an object of this invention to provide a machine which comprises a power driven magnetic conveyor including magnetic holding fixtures to be used in manufacturing plastic-metal self-locking screws or the like of high quality and high strength but at low cost as compared with plastic insert self-locking screws.

A further object of this invention is to provide a relatively inexpensive power driven magnetic conveyor and holding fixture for elongated cylindrically shaped articles of magnetic material.

Another object of this invention is to provide a holding fixture for articles of magnetic material which utilizes a plate magnet and is adapted to be supported for movement upon a power driven endless belt.

SUMMARY OF THE INVENTION

A power driven magnetic conveyor for receiving, positioning and carrying a plurality of articles of magnetic material, according to the principles of the present invention, includes support means, driving and guiding means affixed to the support means, an endless belt forming a closed path operatively coupled to the driving means and being guided for movement relative to the support means by the guiding means, an even number of adjacent article holding fixtures, each fixture being mounted in relatively close proximity and in alignment with each other to enhance the holding power of the fixture and including, a permanent magnet plate having a top face, a side face of north polarity facing in one direction transversely of the path and an oppositely facing face of south polarity facing in the opposite direction transversely of the path, the side faces of north polarity of alternate ones of the plates facing in opposite directions, two magnetic plate members adapted to retain therebetween the permanent magnet plate, the magnetic plate members extending above the top face, two outside non-magnetic members adapted to sandwich said permanent magnet plate and the magnetic plate members therebetween, the outside members being provided with aligned notches for holding and positioning the article and means for affixing the article holding fixtures to the endless belt in single file for movement therewith.

BRIEF DESCRIPTION OF THE DRAWING

Other and further objects of the invention will be apparent from the following description when taken in connection with the accompanying drawings wherein:

FIG. 1 is a view in perspective of a preferred form of a machine embodying the present invention;

FIGS. 2 and 3 are plan and side views respectively of a plastic patch self-locking screw produced by the machine shown in FIG. 1;

FIG. 4 is a sectioned view of the screw of FIGS. 2 and 3 as taken along the line 4—4 of FIG. 2;

FIG. 5 is an enlarged fragmentary view in elevation of the article accumulator or storing means shown at the left of FIG. 1;

FIG. 6 is a fragmentary view in elevation and partly in section taken generally along the line 24—24 of FIG. 5;

FIG. 7 is a reduced fragmentary view in horizontal section taken along the line 25—25 of FIG. 6;

FIG. 8 is an enlarged fragmentary plan view, partly broken away, of a portion of the apparatus shown in FIG. 7 to better illustrate the operation of a certain mechanism;

FIG. 9 is an enlarged fragmentary view, partly in vertical section, taken along the line 27—27 of FIG. 7;

FIG. 10 is an enlarged fragmentary view in vertical section taken generally along the line 28—28 of FIG. 7.

DESCRIPTION OF THE PREFERRED EMBODIMENT

Referring now to the drawings, and in particular to FIGS. 2 through 4, a plastic patch self-locking screw 55, or the like article, with which the present invention is concerned, may comprise a metal body 56, preferably of a magnetic material, having a shank portion provided with a thread 58 of standard thread form and an enlarged head portion 60. A patch 62 of thermoplastic material is bonded to the thread defining surfaces of a plurality of convolutions of the thread 58. The patch 62 covers a pre-selected area of the thread surfaces and is spaced at least one thread convolution from the work entering and 64 of the screw and extends arcuately of the screw thread through a desired angle, less than 180°, and merges gradually at its boundary edges 66 and 68 into the thread defining surfaces of the thread 58.

A preferred embodiment of the machine as constructed in accordance with present invention, comprises a screw or other article supply means 70, FIG. 1, which includes a hopper 72 and which feeds articles, such as screws 55 in heterogeneous array from the hopper 72 to an article orienting and feeding means 74 which delivers oriented screws 55, in individual succession to article accumulator or storing means 76 and unoriented screws into collecting or discharge means 77, the article accumulator or storing means 76 delivering the screws one by one, in individual succession, to a main conveyor 78 which carries the screws in succession first past article heating means 80 and the heated articles then past powder dispensing means 82 and finally past article stripping means 84, which removes the screws 55 from the main conveyor 78 and causes them to be deposited in a chute 86 (FIG. 1) by which they are fed to a receptacle or quenching tank 88.

The plastic powder dispensing means 82 provides a free falling stream of plastic powder through which the heated articles are carried by the main conveyor 78, and the excess powder, i.e., that which is not deposited on the screws, is received in powder recapturing or collecting means 90.

For a detailed explanation of the construction of the article supply means 70, the article orienting means 74, the unoriented article collector means 77, the article accumulator or storing means 76, the article heating means 80, the powder dispensing means 82, and the article stripping means 84 reference may be had to copending application Ser. No. 30,817 filed Apr. 22, 1970 and assigned to the same assignee as the present application.

The main conveyor 78, shown in FIGS. 1 and 5 through 10, comprises a plurality of article receiving and holding means or fixtures 296 arranged serially, in closely spaced relation, upon a flexible belt 298 having a plurality of transverse cleats 300 spaced longitudinally of the belt so that the belt may be driven without slippage by a toothed drum, or plurality of toothed drive wheels, 302 secured to a shaft 304 journalled in suitable bearings mounted upon longitudinally extended sides of the box frame 246.

The drum 302 may be formed with end disks or flanges 306 receiving between them the belt 298 so as to prevent lateral shifting of the belt relative to the driving drum. The drive shaft 304 may be provided at one end with conventional bevel gears, jack shafts and pulleys, not shown, and a non-slip drive belt 314, all of which operatively couple motor 312 to the drive shaft 304, via clutch housing 316.

The box frame 246 of the main conveyor 78 may be supported in any convenient manner, as by supports 318, on a platform 320 of a suitable frame (not shown). The upper flight of the belt 298 is supported upon a suitable plate 322 provided with upwardly extending side flanges 324 to prevent lateral shifting of the belt as it moves along the plate 322. The belt 298 at its end opposite the driving drum 302 passes over an idler pulley or drum 326. Spaced tensioning rollers 328 and 330 are adjustably mounted in any convenient manner on the box frame 246 to engage the inner surface of the lower flight of the belt 298, the rollers 328 and 330 being positioned so that the portion of the belt between them lies in a horizontal plane, as illustrated in FIG. 1.

Each of the article holding means or fixtures 296 comprises a permanent magnet plate 332 positioned between plates 334 and 336 of magnetic material, such as steel. The plates 334 and 336 are sandwiched between magnetic plate 332 and opposed non-magnetic end plates 338 and 340 which are provided with outwardly turned lower edges or flanges 342 and 344, by means of which the fixture may be secured, as by bolts 346, to the belt 298.

The magnetic plates 334 and 336 extend above the permanent magnet plate 332 and the non-magnetic plates 338 and 340 extend above the plates 334 and 336 and each of the plates 338 and 340 is provided in its upper edge with a pair of V-slots 350 and 352. The V-slots extend below the top edge of the magnetic plates 334 and 336 so that the screws received in the notches will be magnetically held by the plates 334 and 336. The plates 332, 334, 336, 338 and 340 may be fastened together as by a rivet 354, which is preferably of non-magnetic material.

The opposite vertical side faces of each permanent magnet plate 332 are of opposite polarity as illustrated in FIG. 8. In order to enhance the holding power of the fixtures, the permanent magnet plates 332 of adjacent fixtures are so arranged or oriented that the south polar face of the plate 332 of one fixture is on the same side as the north polar face of the plate 332 of the adjacent fixture, as illustrated in FIG. 8. With this arrangement there will be an even number of fixtures 296 on belt 298.

The fixtures are carried in individual succession, by the belt 298 beneath the stacking track 208 of the accumulator or storing means 76 with the V-notches of the fixtures facing upwardly so that the shank of the screw at the bottom of the stacking track may pass into a notch aligned with the stacking track and engage the upper edges of the magnetic plates 334 and 336.

The plates 334 and 336 releasably and firmly hold each screw in a position with the axis of the screw extending in a horizontal plane as the fixtures carry the screws away from the stacking track.

Article positioning, adjusting or control means 356 and 358 are provided, as best seen in FIGS. 7 through 10, to precisely position the screws laterally of the fixture 296. Such means comprises a rotatable wheel 360 mounted on a vertical shaft 362 carried by a bar 364 adjustably secured for horizontal adjustment, as by a bolt 336 in a slot 368, to a plate 370 adjustably secured for vertical adjustment, as by bolts 372 in slots 374, to a bar 376 secured in any convenient manner, not shown, to the box frame 246. A belt engaging hold-down device 378 is associated with the control means 356 to insure that the head of each screw will properly contact the face of the wheel 360 as the screw passes the wheel.

The hold-down device 378 may comprise a wheel 380 positioned to engage the surface of the belt 298 just below the wheel 360, the wheel 380 being mounted on a horizontal shaft 382 secured to a vertical bar 384 adjustably secured for vertical adjustment, as by bolts 386 and slots 388, to the mounting bar 376.

It should be noted that the wheel 360 in engaging the heads of the screws and being rotated thereby, shifts the screws laterally of the belt so that the head of each screw is brought into abutting relation with the non-magnetic plates 340 of the screw holding fixtures. The screw position adjusting or control means 358 may comprise an adjustably mounted cam bar 390 inclined to the path of movement of the screws so as to engage the work entering end 64 of each screw and reposition the same laterally of its fixture so that such ends of the screws are positioned a uniform, predetermined distance from the fixture.

The bar 390 may be secured, as by screws 392 to a mounting plate 394 adjustably secured, as by bolts 396 in slots 398, to a mounting plate 400 for adjustment toward and from the fixtures. The plate 400 is secured by a bolt 402 to a vertical bar 404 bolted to the box frame 246.

Belt hold-down devices 406 are associated with the position adjusting means 358 and these devices may comprise a pair of inverted L-shaped bars 408 bolted to the belt supporting and guiding plate 322 and extending over the edges thereof to engage the surface of the belt 298.

The operation of the machine is best described with reference to FIG. 1. The motor 138, operatively connected to the article supply means 70, and the motor 312 having been energized, along with the electric vibrators 106, 118, 276 and 434 operatively connected to the hopper 72, the article orienting means 74, the article accumulator 76 and the powder dispensing means 82, respectively, a supply of screws are dumped into the hopper 72 and the gate 102 adjusted to insure a smooth flow of screws from the bottom of the hopper 72 to the surface of the belt 110 of the article supply means 70. The screws are carried in heterogeneous array by the belt 110 from the hopper 72 to the article orienting means 74 and are discharged into the inclined trough of the article orienting means. As the screws move down the trough, under the action of gravity assisted by the vibrator 168 the majority of the screws gravitate to a position where they are supported by the bottom edges of the trough side walls 144 and 146 and with their shanks extending downwardly.

Since the bottom edges of the trough side walls merge into the upper surfaces of the bars 172 and 174, the oriented screws continue to gravitate down the bars 172 and 174 and pass over the hopper 184 of the unoriented article collector means 77 and into the article accumulator or storing means 76. The screws are accumulated or stored in the stacking track 208. From the stacking track, the screws are fed one by one to the continuously moving magnetic fixtures 296 carried by the main conveyor belt 298. As each screw is carried away from the stacking track by a magnetic fixture, the head of the screw engages the article positioning control wheel 360 and moved thereby transversely of the fixture and the work entering end of each screw then engages cam bar 390 (FIG. 7) so that the screws as they move from the stacking track to the heating means 80 and then to the powder dispensing means 82 are positioned in precisely determined positions laterally of the screw holding fixtures. The magnetic fixtures 296 carry the screws serially between the bars 412 and 414 of the heating means 80 and then past the stream of powder supplied by the powder dispensing means 82. A predetermined limited quantity of plastic powder determined by the shape and dimension of the dispenser opening and the powder dispensing nozzle of the powder dispensing means 82 and by the speed of movement of the belt is deposited on the shank of each heated screw, the powder melting as it engages the heated thread surfaces of each screw and forming a free form liquid pool of selected thermoplastic material.

As the belt carries the screws with their patches of thermoplastic material adhered to the thread surfaces of the screws from the powder means, the screws are allowed to cool thereby solidifying and bonding the patches to that portion of the threaded surfaces which are wetted by the melted thermoplastic material. The screws magnetically retained on the belt by the magnetic fixtures 296 are then carried to the end of the upper flight of the belt and then along the lower flight of the belt until the screws in individual succession engage the article stripper means 84 and are thereby discharged from the magnetic fixtures and into the discharge chute 86 by which they are carried into the receptacle, or oil-quenching tank 88.

The herein described method and apparatus, including fixtures 296, have been used successfully over long production runs to produce patches, as described, on 3/16 inch screws at a rate averaging in excess of 600 per minute.

It has been found that patch adherence can be enhanced if a suitable primer, such as an epoxy, is applied to the screws prior to patch application. This may be done by dipping, in known fashion.

The invention in combination with the machine aspects are well suited, as previously described, to the attainment of the stated objects and advantages but the details of such method and apparatus are not to be taken as limitations upon the scope of the invention except as those details may be included in the appended claims.

What is claimed is:

1. A power driven magnetic conveyor for receiving, positioning, and carrying a plurality of articles of magnetic material, comprising:
   a. support means;
   b. driving and guiding means affixed to said support means;
   c. an endless belt forming a closed path operatively coupled to said driving means and being guided for movement relative to said support means by said guiding means;
   d. an even number of adjacent article holding fixtures, each said fixture being mounted in relatively close proximity and in alignment with each other to enhance the holding power of said fixture and including, a permanent magnet plate having a top face, a side face of north polarity facing in one direction transversely of said path and an oppositely facing face of south polarity facing in the opposite direction transversely of said path, the side faces of north polarity of alternate ones of said plates facing in opposite directions, two magnetic plate members adapted to retain therebetween said permanent magnet plate, said magnetic plate members extending above said top face, two outside non-magnetic members adapted to sandwich said permanent magnet plate and said magnetic plate members therebetween, said outside members being provided with aligned notches for holding and positioning said article; and
   e. means for affixing said article holding fixtures to said endless belt in single file for movement therewith.

2. An apparatus according to claim 1 wherein said notches are V-shaped and extend below said top face of said magnetic plate.

* * * * *